(12) United States Patent  (10) Patent No.: US 8,781,867 B2
Iriyama et al.  (45) Date of Patent: Jul. 15, 2014

(54) MONITORING SYSTEM

(75) Inventors: Yasuomi Iriyama, Kawasaki (JP); Toshiyuki Ito, Kawasaki (JP); Hirokazu Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1078 days.

(21) Appl. No.: 11/527,017

(22) Filed: Sep. 26, 2006

(65) Prior Publication Data

US 2007/0276780 A1 Nov. 29, 2007

(30) Foreign Application Priority Data

May 8, 2006 (JP) ................. 2006-129466

(51) Int. Cl.
G06F 3/00 (2006.01)
(52) U.S. Cl.
USPC .......................................... 705/7.11; 719/318
(58) Field of Classification Search
USPC ....................................................... 719/318
See application file for complete search history.

(56) References Cited

U.S. PATENT DOCUMENTS

| 6,653,963 | B1 * | 11/2003 | Barrenscheen et al. | 341/155 |
| 7,043,566 | B1 * | 5/2006 | Grant et al. | 719/323 |
| 2002/0173997 | A1 * | 11/2002 | Menard et al. | 705/7 |
| 2004/0260602 | A1 | 12/2004 | Nakaminami et al. | |

FOREIGN PATENT DOCUMENTS

| JP | 10-039920 | 2/1998 |
| JP | 2000-190178 A | 7/2000 |
| JP | 2003-132248 | 5/2003 |
| JP | 2003-337982 A | 11/2003 |
| JP | 2004-127017 A | 4/2004 |
| JP | 2004-295487 A | 10/2004 |
| JP | 2005-011053 | 1/2005 |
| JP | 2005-115494 | 4/2005 |

OTHER PUBLICATIONS

Japanese Office Action mailed Dec. 6, 2011 for corresponding Japanese Application No. 2006-129466, with English-language Translation.
Japanese Office Action mailed by JPO and corresponding Japanese Patent Application No. 2006-129466 on May 22, 2012, with English Translation.
Japanese Office Action mailed on Nov. 13, 2012 for corresponding to Japanese Application No. 2006-129466, with English-language Translation.

* cited by examiner

Primary Examiner — William Rankins
(74) Attorney, Agent, or Firm — Fujitsu Patent Center

(57) ABSTRACT

A monitoring system comprising an extracting device monitoring business data used in a business process on a business device and extracting monitoring target data specifying a predetermined item of data from the business data, and a monitoring device processing the monitoring target data given from one or more extracting devices, wherein the extracting device judges, when the business process occurs on the business device, whether or not the business data used in the business process is the monitoring target data, and transmits the monitoring target data to the monitoring device, and the monitoring device aggregates the monitoring target data extracted by the extracting device from one or more extracting devices, stores the aggregated data, analyzes the stored data, then stores the analyzed result data, and notifies the monitoring client of the stored result data.

16 Claims, 16 Drawing Sheets

FIG. 4

|     | ITEM NAME | REFERENCE DESTINATION |
| --- | --- | --- |
| (1) | SYSTEM NAME | /ISIMonitoringEvent/@systemName |
| (2) | SEQUENCE NAME | /ISIMonitoringEvent/@sequenceName |
| (3) | SEQUENCE ID | /ISIMonitoringEvent/@sequenceId |
| (4) | FUNCTION NAME | /ISIMonitoringEvent/FunctionData[n]/@name<br>/ISIMonitoringEvent/SequenceData[n]/@name |
|     | SERVICE NAME | SERVICE NAME CORRESPONDING TO FUNCTION NAME IS SELECTED FROM MASTER DATA |
|     | SEQUENCE PROCESSING TIME | CALCULATED FROM SEQUENCE START TIME AND SEQUENCE END TIME |
| (5) | EVENT TYPE | /ISIMonitoringEvent/FunctionData[n]/@type<br>/ISIMonitoringEvent/SequenceData[m]/@type |
| (6) | EVENT STATUS | /ISIMonitoringEvent/FucntionData[n]/@functionStatus<br>/ISIMonitoringEvent/SequenceData[m]/@functionStatus |
| (7) | BUSINESS MODEL NAME | /ISIMonitoringEvent/@businessName |
| (8) | FLOW NAME | /ISIMonitoringEvent/@flowName |
| (9) | ACTIVITY NAME | /ISIMonitoringEvent/@actName |
| (10) | PROCESS ID | /ISIMonitoringEvent/@processId |
| (11) | EVENT INFORMATION REFERENCE TIME | /ISIMonitoringEvent/FunctionData[n]/@time<br>/ISIMonitoringEvent/SequenceData[m]/@time |

FIG. 5

```
<?xml version="1.0" ?>
<ISIMonitoringEvent sequenceName="bpmct_sequence"                        (2)
    sequenceId="ESI-bpmct_sequence-20060405150815468-75212"-(3)
(1)-systemName="gg7188-vml"businessName="TEST BUSINESS"       (7)
(8)-flowName="TEST FLOW" actName="TEST ACTIVITY"-(9)
(10)-processId="TPID-001" >
<SequenceData type="SEQUENCE-START" -(5)
(11)-time="2006-04-05T15:08:15" />
<FunctionData name="CT_Monitoring_Step1"-(4)
    type="FUNCTION-START"-(5)
(11)-time="2006-04-05T15:08:16" functionStatus=" " />-(6)
<FunctionData name="CT_Monitoring_Step1"-(4)
    type="FUNCTION-END"-(5)
(11)-time="2006-04-05T15:08:17" functionStatus="SUCCESS" />-(6)
<SequenceData type="SEQUENCE-END"-(5)
(11)-time="2006-04-05T15:08:18" />
    functionStatus="SUCCESS" />-(6)
</ISIMonitoringEvent>
```

FIG. 6

<muws-p1-xs:ManegementEvent ReportTime="2006-04-05T15:15:54" > —(0)

<bpmm-s-fmt:BussinessEvents><bpmm-s-fmt:BussinessEvent>

<bpmm-s-fmt:GeneralData

Name= "EVENT"   ReferenceTime="2006-04-05T15:08:15"> — (11)

<bpmm-s-fmt:Data Name= "EVENT TYPE"  Type="xs:string"

(5) ——— Value="SEQUENCE-START"/>

<bpmm-s-fmt:Data Name="SYSTEM NAME" Type="xs:string"

(1) ——— Value="gg7188-vm1">

</bpmm-s-fmt:GeneralData></bpmm-s-fmt:BusinessEvent>

<bpmm-s-fmt:BusinessEvent>

<bpmm-s-fmt:GeneralData

Name= "EVENT"   ReferenceTime="2006-04-05T15:08:16"> — (11)

<bpmm-s-fmt:Data Name= "EVENT TYPE"  Type="xs:string"

(5) ——— Value="FUNCTION-START"/>

<bpmm-s-fmt:Data Name="SYSTEM NAME" Type="xs:string"

(1) ——— Value="gg7188-vm1">

</bpmm-s-fmt:GeneralData></bpmm-s-fmt:BusinessEvent>

<bpmm-s-fmt:BusinessEvent>

<bpmm-s-fmt:GeneralData

Name= "EVENT"   ReferenceTime="2006-04-05T15:08:17"> — (11)

<bpmm-s-fmt:DataName= "EVENT TYPE"  Type="xs:string"

(5) ——— Value="FUNCTION-END"/>

<bpmm-s-fmt:Data Name="SYSTEM NAME" Type="xs:string"

(1) ——— Value="gg7188-vm1">

</bpmm-s-fmt:GeneralData></bpmm-s-fmt:BusinessEvent>

<bpmm-s-fmt:BusinessEvent>

<bpmm-s-fmt:GeneralData

Name= "EVENT"   ReferenceTime="2006-04-05T15:08:18"> — (11)

<bpmm-s-fmt:DataName= "EVENT TYPE"  Type="xs:string"

(5) ——— Value="SEQUENCE-END"/>

<bpmm-s-fmt:Data Name="SYSTEM NAME" Type="xs:string"

(1) ——— Value="gg7188-vm1">

</bpmm-s-fmt:GeneralData></bpmm-s-fmt:BusinessEvent>

</bmm-s-fmt:BusinessEvents></muws-p1-xs:ManagementEvent>

FIG. 12

| EVENT INFORMATION ID | TYPE | PROCESSING | JUDGING METHOD |
|---|---|---|---|
| E35 | XML | TO BE PROCESSED | sequenceName ATTRIBUTE OF ISIMonitoringEvent ELEMENT IS EQUAL TO "bpmmct_sequence" AND systemName ATTRIBUTE IS EQUAL TO "gg7188-vm1" |
| E36 | XML | TO BE UNPROCESSED | sequenceName ATTRIBUTE OF ISIMonitoringEvent ELEMENT IS EQUAL TO "bpmm_seq", AND systemName ATTRIBUTE IS EQUAL TO "fjbpm_8776j" |
| E43 | CSV | TO BE UNPROCESSED | FIRST COLUMN IS EQUAL TO "start_order", AND THIRD COLUMN IS EQUAL TO "ova66k" |
| ... | ... | ... | ... |

FIG. 13

| PROCESSING TARGET ID | EVENT INFORMATION ID | PROCESSING ITEM | PROCESSING METHOD |
|---|---|---|---|
| T23 | E35 | SERVICE NAME | FUNCTION NAME IS USED AS KEY, SERVICE NAME CORRESPONDING TO THIS KEY IS SEARCHED FOR FROM MASTER DATA OF SERVICE NAME, AND SEARCH RESULT IS ADDED |
| T24 | E35 | SEQUENCE PROCESSING TIME | CALCULATION RESULT OF CALCULATING DIFFERENCE BETWEEN SEQUENCE START TIME AND SEQUENCE END TIME IS ADDED |
| T36 | E59 | BUSINESS NAME | MODEL NAME IS USED AS KEY, BUSINESS NAME CORRESPONDING TO THIS KEY IS SEARCHED FOR FROM MASTER DATA OF BUSINESS NAME, AND SEARCH RESULT IS ADDED |
| ... | ... | ... | ... |

FIG. 15

| DELIVERY MAIL ID | ALERT INFORMATION ID | MAIL TRANSMITTING DESTINATION ADDRESS LIST |
|---|---|---|
| M03 | R007 | wwww@yyyy.zzzz.com<br>aaaa@yyyy.zzzz.com<br>bbbb@cccc.dddd.com |
| M04 | R018 | cccc@mmm.zzzz.com |
| M05 | R034 | hhhh@iiii.jjjj.com<br>kkkk@llll.mmmm.com |
| ... | ... | ... |

MONITORING SYSTEM

BACKGROUND OF THE INVENTION

The present invention relates to a monitoring system.

A business device such as a POS (Point of Sales) terminal edits and thus accumulates results processed in the self business device. The business device transmits the accumulated data to a predetermined monitoring device at an interval of a predetermined period, e.g., at the interval of a day. The monitoring device is stored with the data received from the plurality of business devices. The monitoring device processes the stored data in an information format that facilitates the data monitoring by the monitoring client, and provides the monitoring client with the thus processed data.

FIG. 17 shows an example of the monitoring device in the prior art. Connected to a monitoring device 27 are a plurality of business devices 26 depicted as business devices 26A-26D and a management console 31 operated by the monitoring client. The monitoring device 27 accepts an input of event information outputted from the business device 26 at an interval of a predetermined period. The event information contains the processing result by the business device 26. The monitoring device 27 stores the event information in a database 29. The monitoring device 27 reads the event information stored in the database 29, and an event information categorizing unit 28 categorizes the event information. In the monitoring device 27, a display unit 30 displays the categorized information to the monitoring client and sends the categorized information by e-mail to the monitoring client. Thus, the monitoring device 27 provides the monitoring client with the processing results by the plurality of business devices 26.

The following are documents of the prior arts related to the present invention.

[Patent document 1] Japanese Patent Application Laid-Open Publication No. 2003-132248

[Patent document 2] Japanese Patent Application Laid-Open Publication No. 2005-115494

SUMMARY OF THE INVENTION

The business device transmits the data to the predetermined monitoring device at the interval of the predetermined period. Accordingly, such a problem arises that the monitoring client can monitor the data only at the interval of the predetermined period and it is impossible to cope with a realtime operation such as grasping a processing content within a predetermined period of time since execution of the business process by the business device.

The present invention was devised in view of such a problem. It is an object of the present invention to provide a monitoring technology capable of monitoring the process by the business device in realtime.

The present invention adopts the following configurations in order to solve the problem.

(1) Namely, a monitoring system according to the present invention comprises an extracting device monitoring business data used in a business process on a business device and extracting monitoring target data conforming with a predetermined monitor condition from the business data, and a monitoring device processing the monitoring target data given from one or more extracting devices, the extracting device including a monitoring target data judging unit judging, when the business process occurs on the business device, whether or not the business data used in the business process is the monitoring target data, and a transmitting unit transmitting the thus-judged monitoring target data to the monitoring device, the monitoring device including a monitoring target data storage unit stored with the monitoring target data extracted by the extracting device, a monitoring target data analyzing unit analyzing the monitoring target data stored in the monitoring target data storage unit, a result storage unit stored with result data analyzed by the monitoring target data analyzing unit, and a display unit notifying a monitoring client of the result data stored in the result storage unit.

According to this configuration, the extracting device, when the business process such as inventory management occurs on the business device, judges whether or not the business data used in the business process is the monitoring target data, and transmits the monitoring target data to the monitoring device. This monitoring device aggregates the monitoring target data extracted by the extracting device from one or more extracting devices, stores the aggregated data, analyzes the stored data, then stores the analyzed result data, and notifies the monitoring client of the stored result data. Thus, this monitoring system can monitor the process on the business device and can notify the monitoring client of the monitor result at a point of time when the process occurs.

(2) Further, the monitoring system according to the present invention, may further include a setting information storage unit stored with predetermined items of setting information that are referred to by the monitoring target data analyzing unit and the display unit of the monitoring device when executing respective processes thereof. Then the monitoring target data analyzing unit and the display unit may read the setting information stored in the setting information storage unit, and may execute the respective processes on the basis of the readout setting information.

According to this configuration, in the monitoring system, the extracting device can execute the variety of processes corresponding to the setting information on the basis of the setting information stored in the setting information storage unit.

(3) Moreover, in the monitoring system according to the present invention, the display unit may further include an electronic mail transmitting unit converting the result data into data in a data format notifying of the result data by electronic mail, and providing the monitoring client with the converted result data via a mail delivery server connected to the monitoring device.

According to this configuration, the monitoring system can convert the monitor result obtained by the monitoring system into the data in the data format notifying of the monitor result by e-mail, and can notify the monitoring client of the converted monitor result via the mail delivery server connected to the monitoring device.

(4) Furthermore, in the monitoring system according to the present invention, the display unit may include a Web format converting unit converting the result data into data in a data format displaying the result data on a Web site, and a display unit displaying the monitor result converted by the Web format converting unit to the monitoring client via a Web server.

According to this configuration, the monitoring system can convert the monitor result obtained by the monitoring system into the data in the data format displaying the monitor result on worldwide Web, and can notify the monitoring client of the monitor result via the worldwide Web by outputting the converted monitor result to the Web server.

(5) Still further, in the monitoring system according to the present invention, the monitoring target data analyzing unit may include at least one of a collecting unit assorting the monitoring target data into predetermined groups and thus collecting the monitoring target data, a statistical unit that statistically processes the monitoring target data, an alert judging unit comparing the monitoring target data with the setting information and generating alert information corresponding to a result of the comparison, and a presuming unit presuming a prospective piece of information, at a time after a predetermined period of time, of the information contained in the monitoring target data.

According to this configuration, the monitoring system can execute any one of processes such as assorting the monitoring target data into the predetermined groups and thus collecting the monitoring target data, doing the statistical process of the monitoring target data, comparing the monitoring target data with the setting information and generating the alert information corresponding to the result of the comparison, and presuming the prospective piece of information, at a time after the predetermined period of time, of the information contained in the monitoring target data.

The extracting technology according to the present invention can be actualized as an extracting method having the same features. Further, the extracting technolog according to the present invention can be actualized as a program that makes a computer function as the extracting device and actualized as a storage medium stored with this program.

The monitoring technolog according to the present invention can be actualized as a monitoring method having the same features. Moreover, the monitoring device according to the present invention can be actualized as a program that makes a computer function as the monitoring device and actualized as a storage medium stored with this program.

According to the present invention, it is possible to provide the technology capable of monitoring in realtime the process by the business device.

BRIEF DESCRIPTION OF THE DRAWINGS

FIG. 4 is a chart showing an example of data contained in the event information according to the embodiment of the present invention;

FIG. 5 is a chart showing an example of the event information detected by an event information extracting device according to the embodiment of the present invention;

FIG. 6 is a chart showing a data example in a standard event format according to the embodiment of the present invention;

FIG. 12 is a table showing a judging method used for judging the event information according to the embodiment of the present invention;

FIG. 13 is a diagram showing a processing method for the monitoring target event information according to the embodiment of the present invention;

FIG. 15 is a diagram showing a relationship between alert information and a mail transmitting destination address list according to the embodiment of the present invention;

DETAILED DESCRIPTION OF THE INVENTION

A monitoring system in an embodiment of the present invention will hereinafter be described with reference to the drawings. A configuration in the following embodiment is an exemplification, and the present invention is not limited to the configuration in the embodiment.

<<Architecture of Whole System>>

Figure 1:
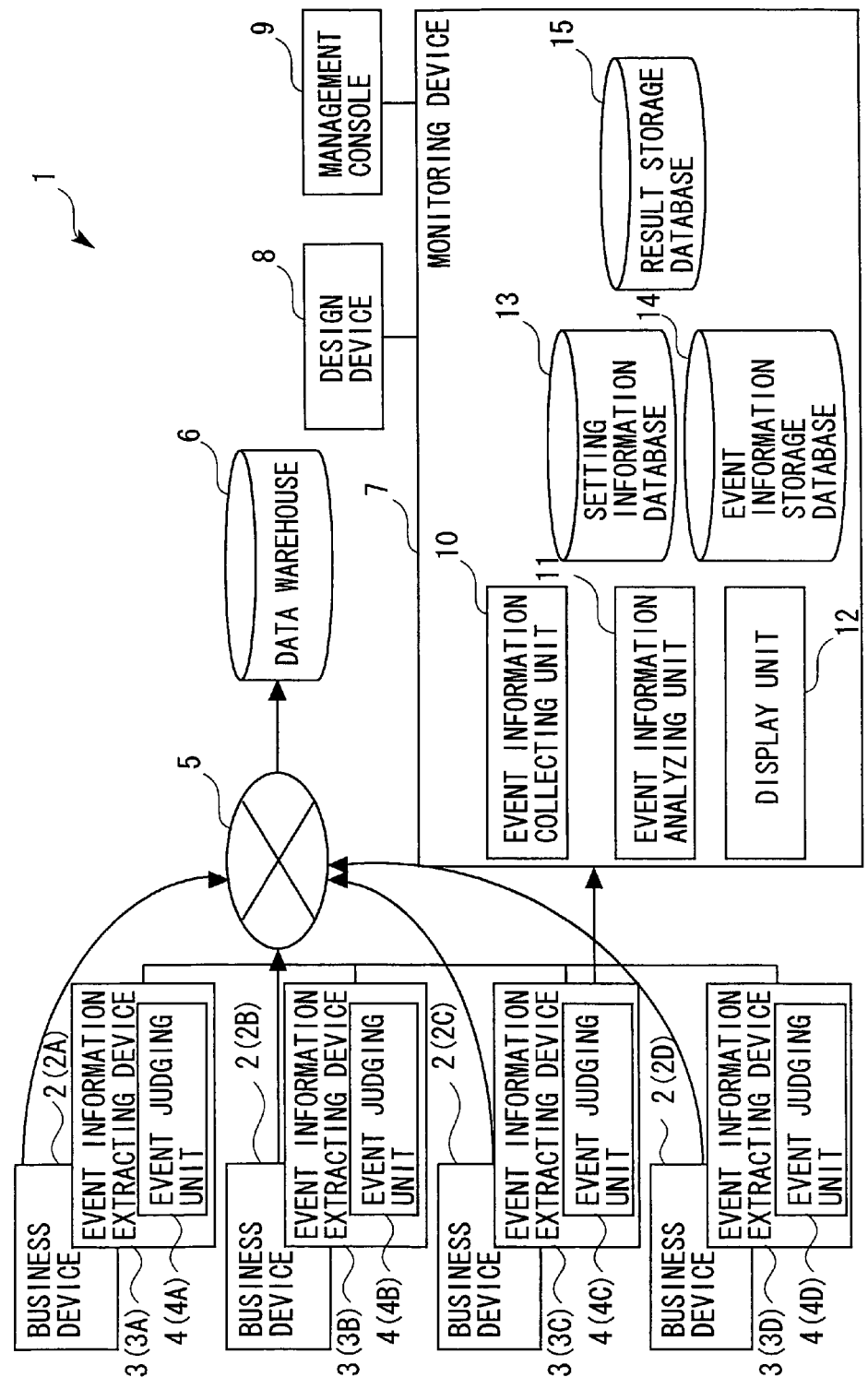
FIG. 1 is a diagram showing a system according to an embodiment of the present invention.

FIG. 1 is a basic architecture diagram showing a system 1 according to the present embodiment. The system 1 is configured by a plurality of business devices 2 shown as business devices 2A-2D, event information extracting devices 3A-3D connected to respectively to the business devices 2A-2D and shown as event information extracting devices 3, a network 5 connected to the business devices 2A-2D, a data warehouse 6 connected to the network 5, a monitoring device 7 connected via a network etc to the event information extracting devices 3A-3D, a design device 8 connected to the monitoring device 7, and a management console 9 connected to the monitoring device 7.

The system 1 can be classified into a business system employed for the business and a monitoring system used for monitoring the business. The business system is constructed of the business devices 2, the network 5 and the data warehouse 6 built up by adding a data management function to a database. Further, the monitoring system is constructed of the business devices 2, the event information extracting devices 3, the monitoring device 7, the design device 8 and the management console 9.

The business device 2 is a POS terminal etc and is exemplified such as a register device etc installed at a supermarket. The business device 2 transmits, via the network 5 to the data warehouse 6, a processing result at an interval of a predetermined period, e.g., a result of aggregating sales at a commercial facility, a result of receiving and paying money at a financial institution, and so on.

The business device 2 can be actualized by use of a computer including a hard disc stored with a program for executing processes in the present embodiment, a central processing unit that executes this program and a memory used for temporarily storing information. A function of the business device 2 is actualized in such a way that the central processing unit loads the program stored in the hard disc into the memory and executes this program.

The data warehouse 6 is stored with the aggregate results given from the plurality of business devices 2. Data stored in the data warehouse 6 contain, e.g., a list of sold commercial articles and are employed for inventory management etc of the commercial articles at the supermarket.

The event information extracting device 3 is connected to the business device 2. The event information extracting device 3 can be actualized by use of the computer including the hard disc stored with the program for executing the processes in the present embodiment, the central processing unit that executes this program and the memory used for temporarily storing the information. A function of the event information extracting device 3 is actualized in such a way that the central processing unit loads the program stored in the hard disc into the memory and executes this program. Further, the event information extracting device 3 may be configured integrally with the business device 2 and also be actualized by executing the program stored in the business device 2.

The event information extracting device 3 detects event information representing an execution status of an application employed for processing each item of business in the business device 2. The event information extracting device 3 detects the event information transmitted to the data warehouse 6 from, e.g., the business device 2 via a communication line.

Therefore, the event information extracting device 3 may also be actualized by the central processing unit's executing the program built (preinstalled) in the business device 2. Further, the event information extracting device 3 is so connected as to be externally attached to the business device 2 and may also be configured in a way that monitors the communication line extending between the business device 2 and the data warehouse 6. Moreover, the event information extracting device 3 is installed on the communication line between the business device 2 and the data warehouse 6 and may also be configured in a way that monitors the communication line.

The event information extracting device 3 (corresponding to an extracting device according to the present invention) has an event judging unit 4 (corresponding to a monitoring target data judging unit according to the present invention). The event judging unit 4 monitors the event information detected by the event information extracting device 3, and judges whether this event information is monitoring target event information (monitoring target data) or not.

The event information is a piece of information representing the execution status of the application used for processing each item of business in the business device 2. A criterion for the judgment executed by the event judging unit 4 is previously set by the business device 2. Further, this criterion for the judgment may also be set by a monitoring client with the design device 8 through the monitoring device 7. A vendor of the event information extracting device 3 may define the event information corresponding to a user's business via a user interface of the design device 8. For example, if the user serves in the commercial facility, [sales] may be set as the event information. The event information extracting device 3 transmits the event information judged by the event judging unit 4 to the monitoring device 7 (the event information extracting device 3 executing this process corresponds to a transmitting unit).

The monitoring device 7 receives and stores the event information transmitted from the event information extracting device 3. The monitoring device 7 analyzes the stored event information. The monitoring device 7 notifies the monitoring client of an analyzed result by opening this result to the public on a Web or by e-mailing the result. An event information processing method etc in the monitoring device 7 is set by the design device 8. Further, management about startup etc of the monitoring device 7 is executed through the management console 9. Moreover, the monitoring device 7, to which a mail delivery server (unillustrated) and a Web server (not shown) are connected, may also notify the monitoring client of a monitor result in the monitoring system 16 via these servers.

The monitoring device 7 includes an event information collecting unit 10, an event information analyzing unit 11, a display unit 12, a setting information database 13, an event information storage database 14 and a result storage database 15. Respective functions of these function blocks included in the monitoring device 7 will be explained later on with reference to FIGS. 2-8.

The design device 8 is a personal computer etc connected to the monitoring device 7. The design device 8 can be actualized by use of the computer including the hard disc stored with the program for executing the processes in the present embodiment, the central processing unit that executes this program and the memory used for temporarily storing the information. A function of the design device 8 is actualized in such a way that the central processing unit loads the program stored in the hard disc into the memory and executes this program. The design device 8 sets, based on an operation by the monitoring client, the processing method etc of the event information received by the monitoring device 7 as setting information in the setting information database 13.

The management console 9 is a personal computer etc connected to the monitoring device 7. The management console 9 can be actualized by employing the computer including the hard disc stored with the program for executing the processes in the present embodiment, the central processing unit that executes this program and the memory used for temporarily storing the information. A function of the management console 9 is actualized in such a way that the central processing unit loads the program stored in the hard disc into the memory and executes this program. The management console 9 sets, based on an operation by the monitoring client, information about a maintenance work etc of the monitoring device 7 and environment setting thereof as the setting information in the setting information database 13, and carries out the startup and a stop of the monitoring device 7.

<<Configuration of Monitoring System>>

Figure 2:
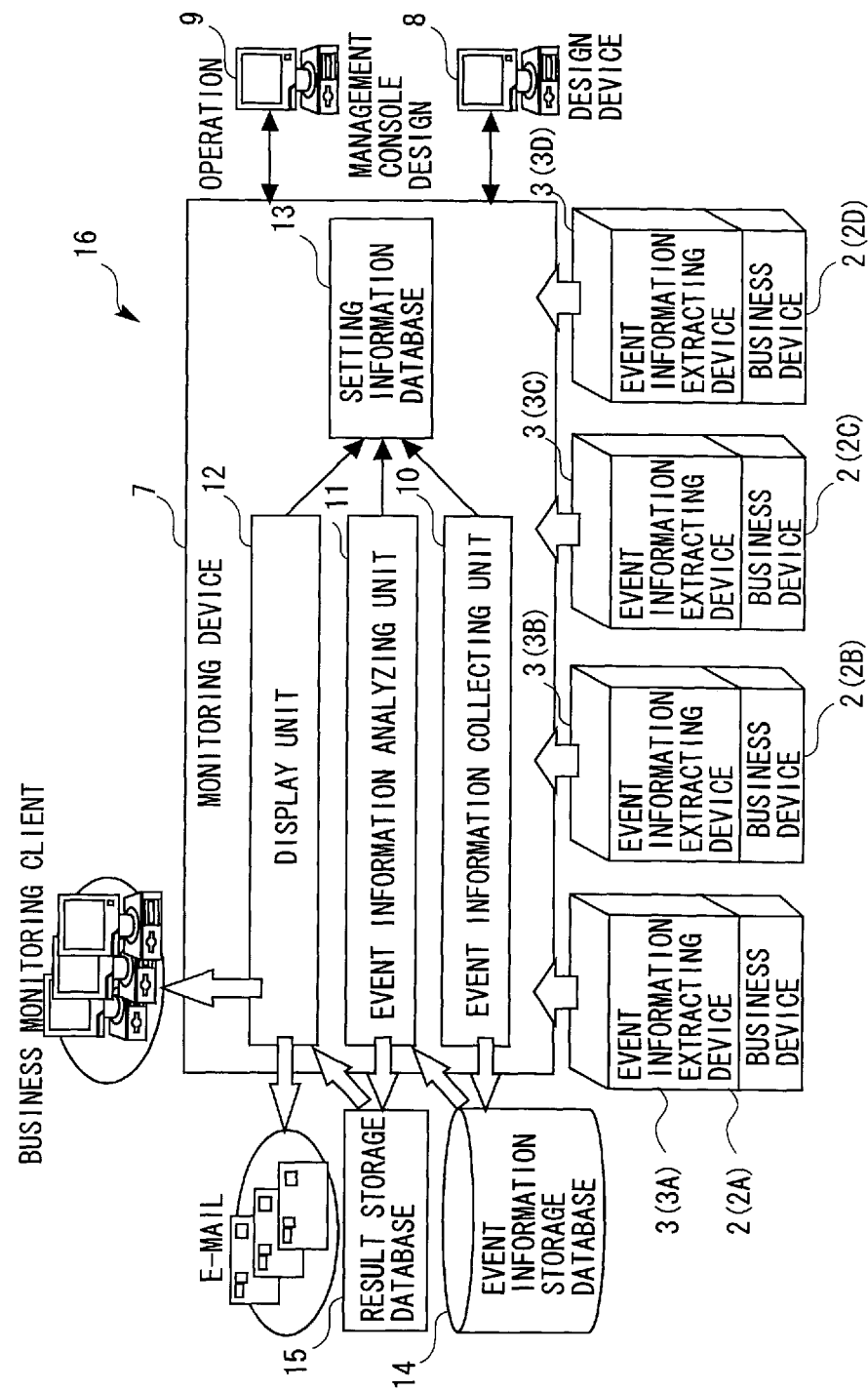
FIG. 2 is a diagram showing a monitoring system in the embodiment of the present invention.

A configuration of the monitoring system in the present embodiment will be explained with reference to FIG. 2. The monitoring system 16 includes the business device 2, the event information extracting device 3, the monitoring device 7, the design device 8 and the management console 9. A way of how the monitoring system 16 monitors the data (business data) processed by the business device 2 will be explained based on configurations of these components.

At first, the business device 2 executes business processes (events). The event information extracting device 3 detects and extracts, in the processes by the business device 2, a processing result of the monitoring target process as the event information. The event information extracting device 3 transmits the extracted event information to the monitoring device 7. The event information collecting unit 10 provided in the monitoring device 7 receives the event information. The event information collecting unit 10 stores, based on the setting information stored in the setting information database 13, the received event information in the event information storage database 14. The event information analyzing unit 11 reads the data from the event information storage database 14. The event information analyzing unit 11 analyzes, based on the setting information stored in the setting information database 13, the data read from the event information storage database 14. The event information analyzing unit 11 stores the result storage database 15 with result data representing a result of the analysis. The display unit 12 transmits, based on the setting information stored in the setting information database 13, the result data read from the result storage database 15 by an electronic mail (e-mail) via the e-mail server (unillustrated). Further, the display unit 12 displays the result data on the Web via the Web server (unillustrated), thus notifying the monitoring client of the result data. In this way, the monitoring system 16 monitors the processes by the business device 2.

Next, the functions of the respective function blocks included in the monitoring device 7 will be described. To begin with, the processing function executed between the event information extracting device 3 and the event information collecting unit 10, will be explained with reference to FIGS. 3-6.

<Event Information Extracting Device>

Figure 3:
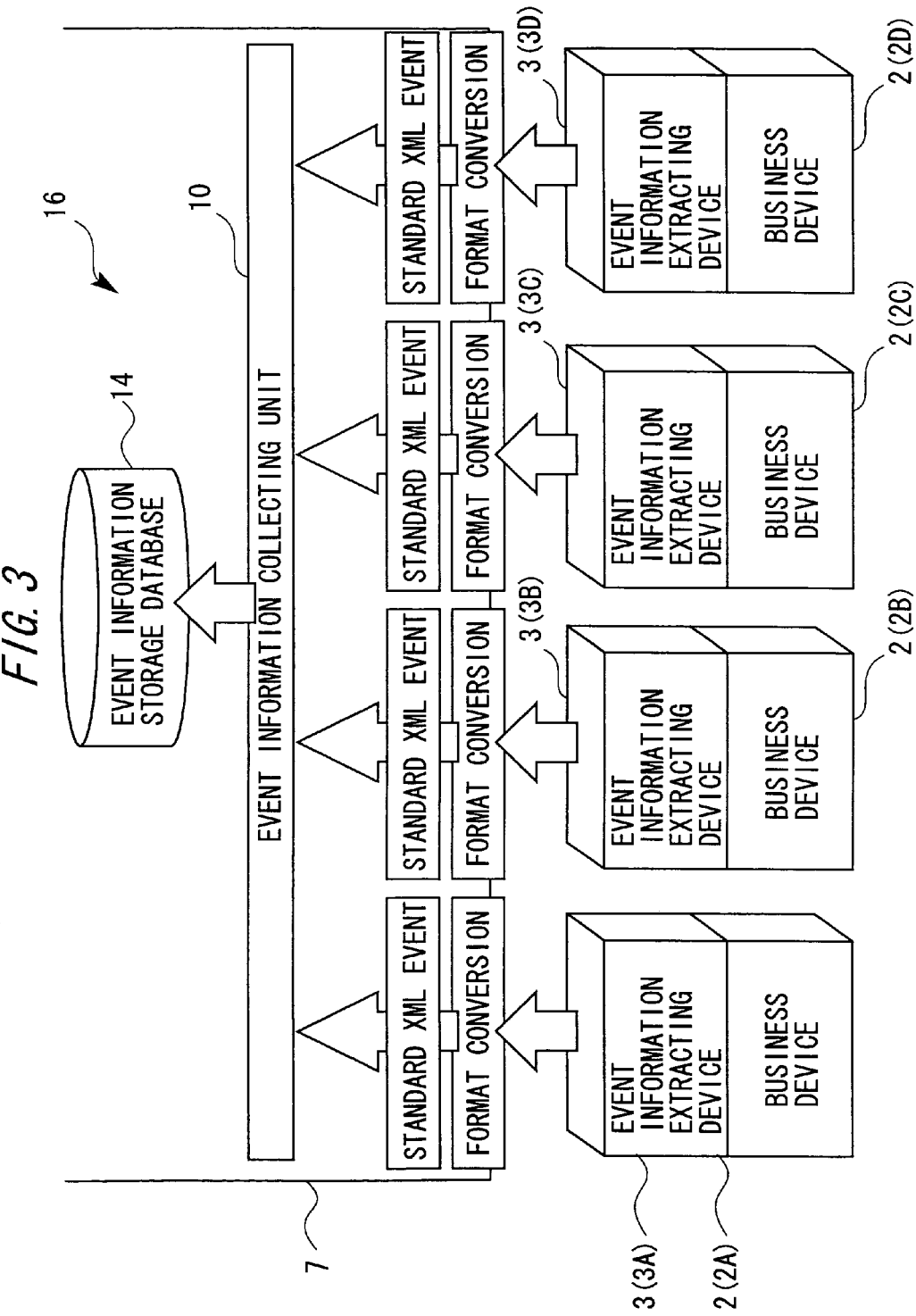
FIG. 3 is a diagram showing an event information collecting unit according to the embodiment of the present invention.

FIG. 3 shows an operation of how the event information extracting devices 3 connected respectively to the plurality of business devices 2 transmit the event information to the event information collecting unit 10. The event information extracting device 3 extracts the monitoring target event information from the business device 2. The event information extracting device 3 converts the extracted event information into a data format suited to the processing in the event information collecting unit 10. FIG. 3 shows by way of an example that the event information extracting device 3 converts the data extracted from the business device 2 into standard-event-formatted data described in an XML (eXtensible Markup Language) format, and transmits the thus-converted data to the event information collecting unit 10. The event information collecting unit 10 stores, based on the setting information stored in the setting information database 13, the event information storage database 14 with the event information received from the event information extracting device 3.

Next, an operation of how the event information extracting device 3 converts the event information into the information in the standard XML (extensible Markup Language) format, will be explained with reference to FIGS. 4-6. The event information extracting device 3 may not, however, convert the event information into the standard-event-formatted data, while the event information collecting unit 10 may convert the event information received from the event information extracting device 3 into the standard-event-formatted data.

FIG. 4 shows an example of the information structuring the event information extracted from the business device 2 by the event information extracting device 3 and an example of a storage destination (storage location) (which is a location on an XML database described in an XML path format) thereof. In FIG. 4, an item name represents a type of the information structuring the event information, and a reference destination represents the storage destination (storage location) of the information. A relationship between these item name and reference destination is set corresponding to the processing target business system through the user interface of the design device 8. The relationship between these item name and reference destination is stored in the setting information database 13.

[System name] is information for designating the business device 2 (which is, e.g., a server name of the computer). [Sequence name] is information that shows the process in the business device 2. Further, [sequence ID] is an identifier specifying the process in the business device 2'. [Function name] is information representing a low-order process (function) of the sequence showing the process in the business device 2. [Service name] is assigned a function name in an easily distinguishable manner and is information associated with this function name. This information is selected from the function name through master data. For instance, when the function name is [001], the service name is [delivery], and when the function name is [002], the service name is [order].

[Sequence processing time] is calculated from start time of a sequence and end time of the sequence. [Event type] is information designating a type of the event information. [Event status] is information designating a status in the event information. [Business model name] is information designating a name of the business. [Flow name] is a name of a flow that specifies a group consisting of a plurality of sequences. [Activity name] is information designating a position of the event information in the flow. [Process ID] is an identifier of each individual event in the flow.

As shown in FIG. 4, for example, [system name] is stored in /ISIMonitoringEvent/@systemName of the event information extracting device 3. The event information extracting device 3 extracts, based on the reference destination defined in the setting information database 13, the system name stored in /ISIMonitoringEvent/@systemName.

FIG. 5 is a diagram showing an example of the event information extracted from the business device 2 by the event information extracting device 3. Round brackets shown in FIG. 4 correspond to round brackets illustrated in FIG. 5. As [system name] indicated by (1) in FIG. 4, "gg7188-vm1" is set in FIG. 5. Further, as [sequence name] indicated by (2) in FIG. 4, "bpmct_sequence" is set in FIG. 5. In the present embodiment, it is judged from [system name] and [sequence name] whether the event information is the information that should be extracted or not.

Note that FIG. 5 shows that the event information is described in a tag format, while FIG. 4 shows that the storage destination (storage location) of the event information within the XML database is described in the XML path format. Accordingly, in the present embodiment, each item (e.g., systemName indicated by (1)) of the event information shown in FIG. 5 is actually stored in the reference destination (e.g., /ISIMonitoringEvent/@systemName indicated by (1)) in FIG. 4 within the unillustrated XML database.

FIG. 6 shows a data example in the standard event format. The event information extracting device 3 extracts the data stored in the reference destination (see the example in FIG. 4) defined in the setting information database 13, and generates the data in the standard event format. The round brackets shown in FIG. 6 correspond to the round brackets shown in FIGS. 4 and 5, respectively. Further, (0) shown in FIG. 6 represents time when the event information extracting device 3 generates the data in the standard event format.

<Event Information Analyzing Unit>

Figure 7:
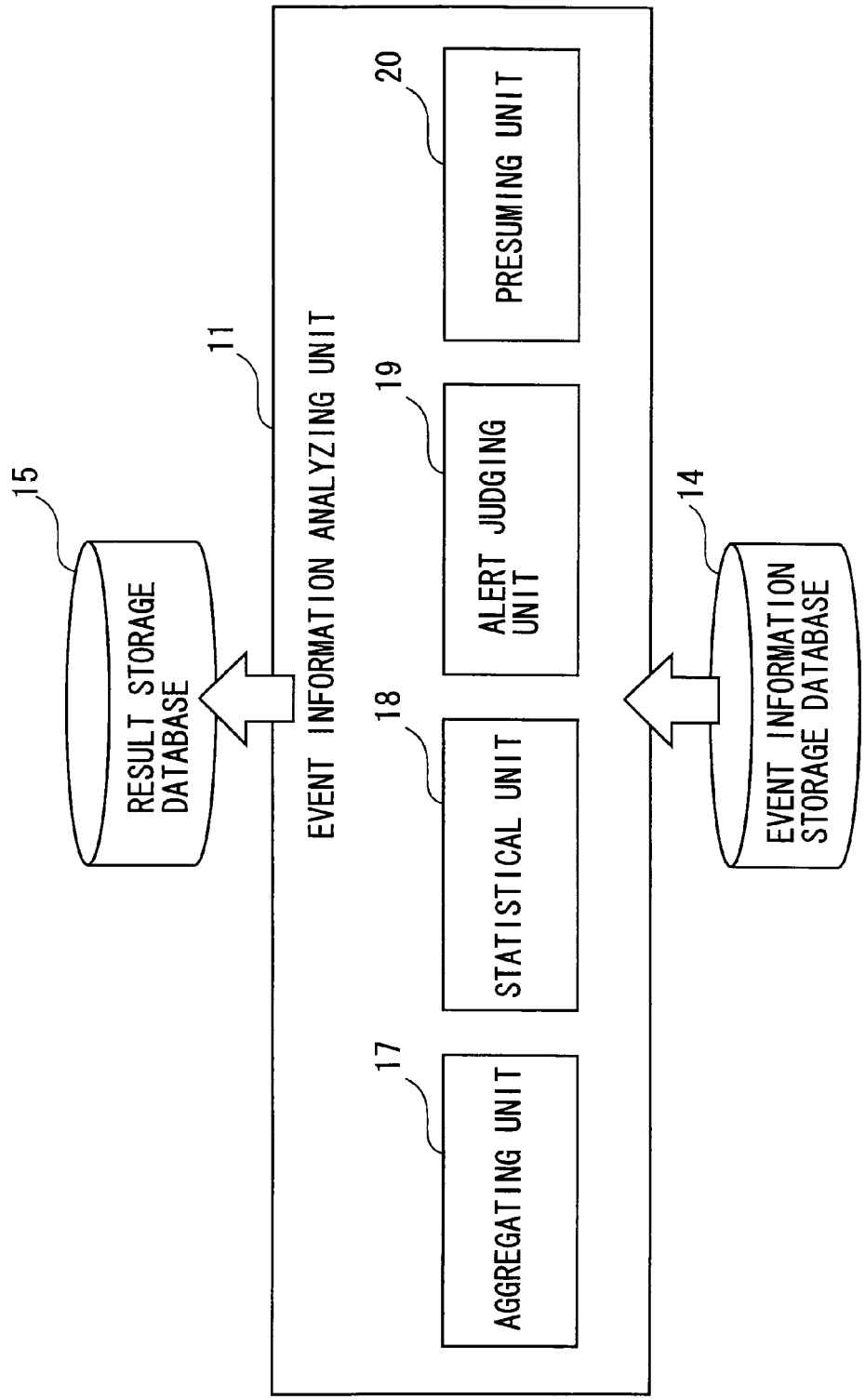
FIG. 7 is a diagram showing an event information analyzing unit according to the embodiment of the present invention.

FIG. 7 illustrates an operation of how the event information analyzing unit 11 analyzes the data read from the event information storage database 14 and stores the analyzed result thereof in the result storage database 15.

The event information analyzing unit 11 includes an aggregating unit 17, a statistical unit 18, an alert judging unit 19 and a presuming unit 20. The event information analyzing unit 11, after processing the event information respectively in the alert judging unit 19 and the presuming unit 20, stores a result of this analysis in the result storage database 15.

The aggregating unit 17 assorts, based on the setting information, the event information into predetermined groups and executes aggregations thereof. The aggregating unit 17 may execute the aggregations by assorting the event information according to, for instance, a predetermined region, a predetermined day of the week, a predetermined period of time, a person in charge of the business device 2 or a group organized by combining some of these items. Further, the aggregating unit 17 may also hierarchically assort the event information in a way that divides the event information into the predetermined groups and further subdividing the divided information into predetermined subgroups, thus repeating this process. For example, if the event information is the information on the sales, the whole country is separated into the East region and the West region, and the East region is separated into districts such as Tokyo and Kanagawa, wherein the aggregation is conducted.

The statistical unit 18 executes, based on the setting information stored in the setting information database 13, a statistical process of the information contained in the event information. For instance, the statistical unit 18 calculates, based on the setting information, an average value, a standard deviation and a distribution of an amount of proceeds at the supermarket, which are contained in the event information.

The alert judging unit 19 executes an alert judgment about the information contained in the event information on the basis of a predetermined rule contained in the setting information stored in the setting information database 13. For instance, the alert judging unit 19, when the information representing the amount of proceeds profited from the individuals is equal to or greater than a predetermined amount, makes a judgment so as to output an alert. The alert judging unit 19, when judging that the alert should be outputted, generates alert information.

Further, the alert judging unit 19 judges a relationship between the plural events on the basis of a predetermined rule contained in the setting information. The alert judging unit 19, when individual identifiable information such as information on a credit card and a cash card is used on the business device 2 and if a predetermined amount is expended a predetermined or greater number of times for a predetermined period, may make the judgment so as to output the alert.

The presuming unit 20 presumes, based on the setting information stored in the setting information database 13, a variation quantity, with respect to the time, of the information contained in the event information. For example, the presuming unit 20 presumes how much a predetermined item of articles will be left at a predetermined retail store after several hours. The presumption may be made in a way that obtains a trend seen in the number of sold articles by applying, e.g., a low-pass filter to a fluctuation in the number of sold articles accumulated for every occurrence of sale information defined as the event information. Then, a prospective inventory may be presumed from the present inventory.

<Display Unit>

Figure 8:
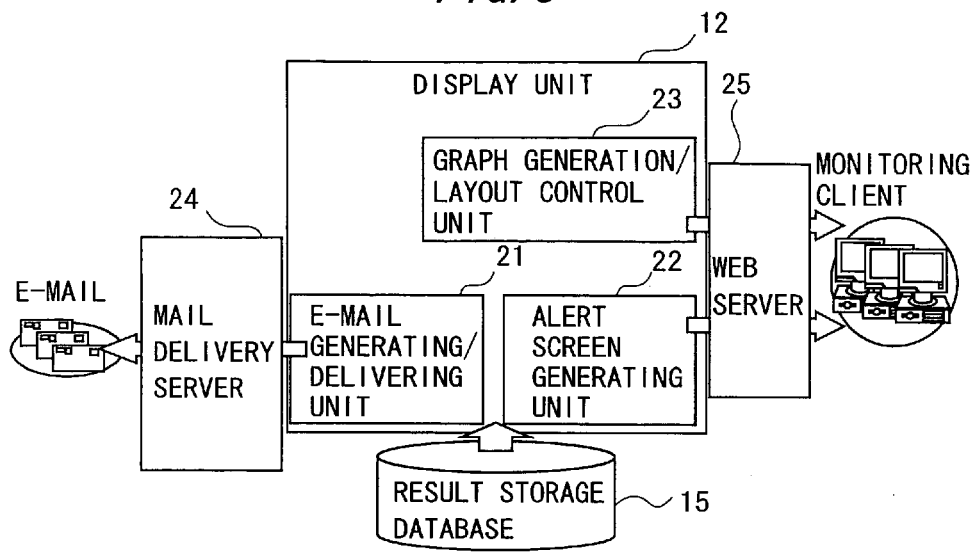
FIG. 8 is a diagram showing a display unit according to the embodiment of the present invention.

FIG. 8 shows a process of the display unit 12. The display unit 12 reads the result data from the result storage database 15, and transmits the result data by an e-mail to the monitoring client via a mail delivery server 24 connected to the monitoring device 7. Further, the display unit 12 displays the result data as the on-Web information on the monitoring client via a Web server 25 connected to the monitoring device 7.

The display unit 12 includes an e-mail generating/delivering unit 21, an alert screen generating unit 22 and a graph generation/layout control unit 23. The e-mail generating/delivering unit 21 converts the data such as the alert information stored in the result storage database 15 into data in an e-mail format, and transmits the data to the monitoring client via the mail delivery server 24.

The alert screen generating unit 22, if the result data contain designation of issuing the alert to the monitoring client, generates the alert information to be displayed as the on-Web information on the monitoring client. Then, the alert screen generating unit 22 displays the alert information as the on-Web information on the monitoring client via the Web server 25.

The graph generation/layout control unit 23 generates graph data for showing a graph on the Web from the result data stored in the result storage database 15. The graph generation/layout control unit 23 displays the graph data on the monitoring client via the Web server 25. Further, the graph generation/layout control unit 23 carries out layout (layout of the information) for displaying the information as the on-Web information on the monitoring client via the Web server 25.

<Management Console and Design Device>

Figure 9:
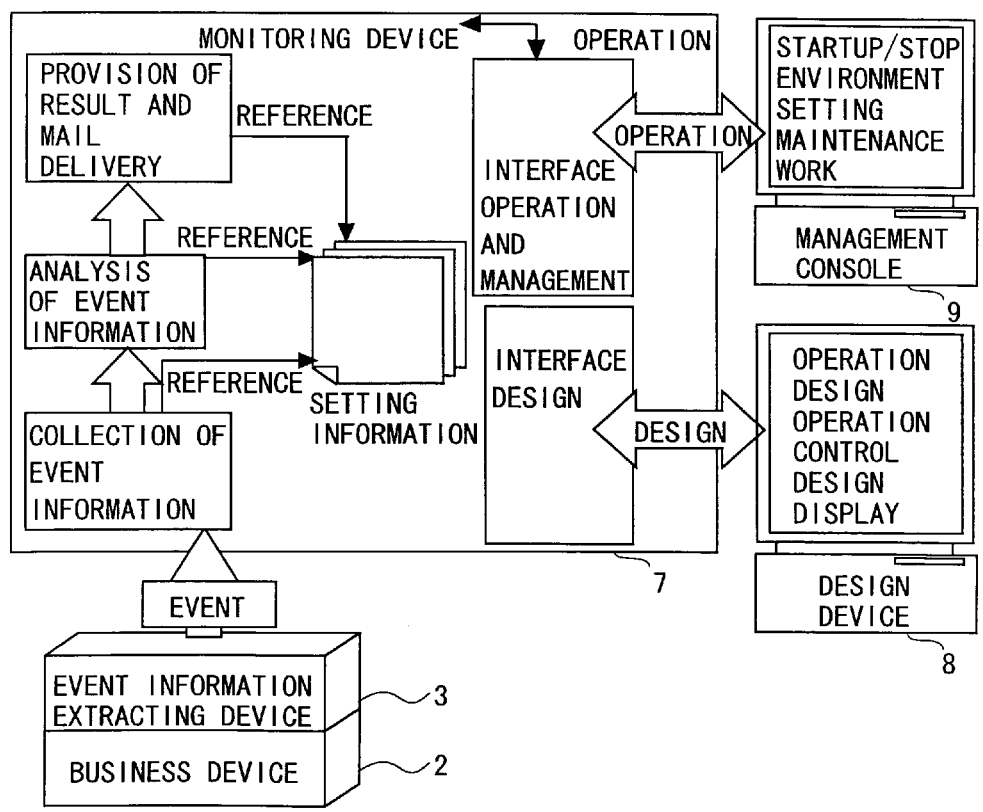
FIG. 9 is a diagram showing a design device and a management console according to the embodiment of the present invention.

Operations by the design device 8 and the management console 9 will be illustrated with reference to FIG. 9. The design device 8, which is connected to the monitoring device 7, is operated by the monitoring client and executes an operation design, operation control and setting display of the monitoring device 7 via a design interface. The design device 8 executes, as the operation design, setting of display specifications of the event information and setting of a display mode of the alert information. The design device 8 executes, as the operation control, the startup and the stop of the event information extracting device 3. The design device 8 executes, as the setting display, the setting for facilitating visuality of the processes in the monitoring device 7.

The management console 9 is connected to the monitoring device 7, and executes the startup and the stop, the environment setting and the maintenance work of the monitoring device 7 via an operation management interface. The management console 9 sets a password of the monitoring device 7 as the environment setting. Further, the management console 9 sets, as the environment setting, connecting information between applications for designating how the information is transferred and received between a plurality of applications executed by the event information extracting device 3 and by the monitoring device 7. The management console 9 executes, as the maintenance work, update of the application executed by the monitoring device 7 and backup of the data stored in the monitoring device 7.

Figure 10:
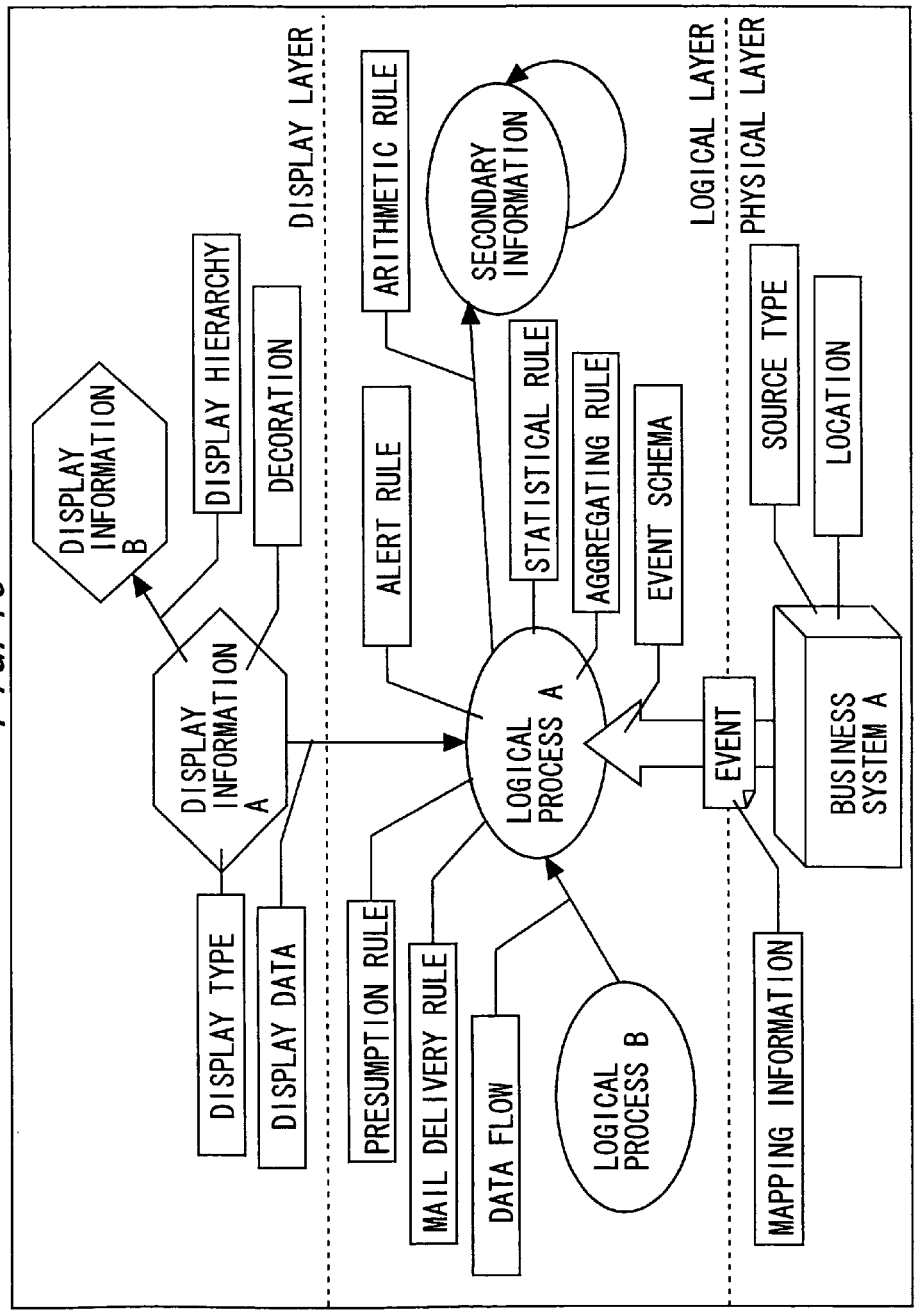
FIG. 10 is a diagram showing a setting target set by the design device according to the embodiment of the present invention.

Given next is an explanation of the setting that can be done for the monitoring system 16 by the design device 8 with reference to FIG. 10. A target layer of the setting by the design device 8 can be classified into three layers such as a physical layer, a logical layer and a display layer. A setting result is stored as the setting information in the setting information database 13.

At first, the setting items on the physical layer are [mapping information], [source type] and [location]. The mapping information contains information for converting the event information into information in a data format when the event information is processed on the logical layer. [Source type] is information that designates a type of a source code of the event information. Contained as [source type] is, for instance, information that designates the type of the source code as the XML format. [Location] contains information that designates a storage destination (storage location) of the event information. On the logical layer, the process in the monitoring device 7 is actualized as a single logical process or a plurality of logical processes. Further, the transfer and reception of the data between these logical processes may also be executed. Moreover, a result generated by the logical process may be set as primary information, and secondary information may also be generated as a further process of the primary information.

[Presumption rule] is information for presuming information after an elapse of a predetermined period of time based on the information contained in the event information. [Mail delivery rule] is information representing a mail delivery rule (e.g., a delivery destination) for providing the processing result in the monitoring device 7 to the monitoring client. [Data flow] contains information for transferring and receiving the data from the logical process B to the logical process A. Further, the data may also be transferred and received from the logical process A to the logical process B. [Alert rule] contains information for judging in the logical process A whether or not the alert is required to be generated from the information contained in the event information. [Arithmetic rule] contains a rule of an arithmetic operation of the information contained in the event information. [Statistical rule] contains information on a statistical method etc used for the statistical process of the information contained in the event information. [Aggregating rule] contains information on an aggregating method etc for assorting the event information into the predetermined groups and thus aggregating the information. [Event schema] contains information for assigning the event information to the logical process.

On the display layer, the process in the monitoring device 7 is processed as plural items of display information. Then, the data may also be transferred and received between these items of display information. [Display type] contains information that designates a type of the information provided to the monitoring client. [Display data] is outputted from the logical process and contains data provided to the monitoring client. [Decoration] contains information that designates a way of displaying the display information. [Display hierarchy] contains information facilitating the visuality of the result given by the logical process on the monitoring client in a way that divides the display hierarchy by categorizing the display information into, e.g., display information A and display information B and thus displaying the hierarchized display information to the monitoring client.

The display unit 12 displays the setting target information set by the design device 8. Therefore, a user of the monitoring client (or a system vendor) can set the setting information while visually grasping a flow of the information representing the relationship between the logical process and the event information by employing the design device 8.

<<Operational Example>>
<Process in Event Information Extracting Device>

Figure 11:
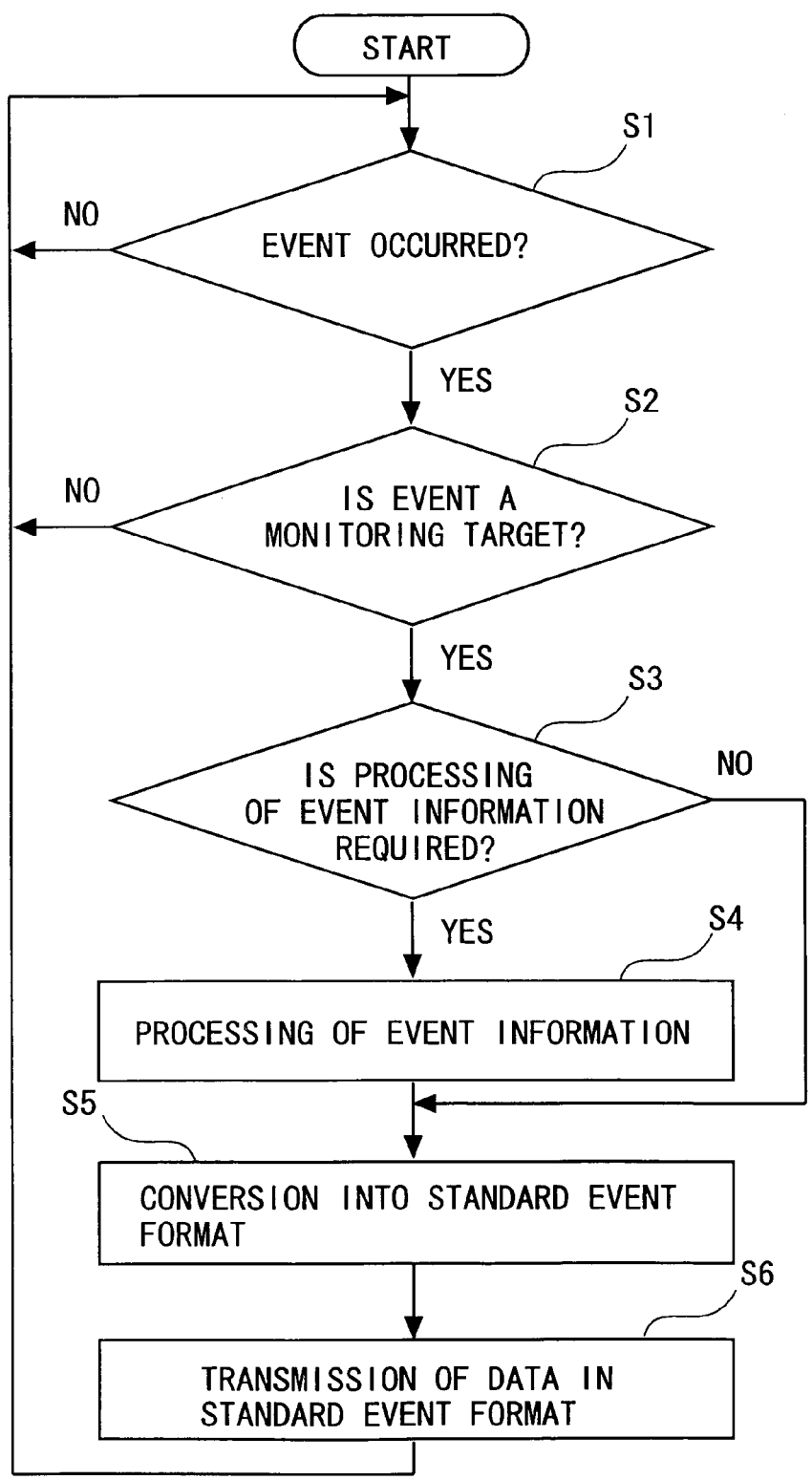
FIG. 11 is a flowchart showing a process in the event information extracting device according to the embodiment of the present invention.

The process in the event information extracting device 3 will be explained with reference to FIG. 11. In this process, the event information extracting device 3 detects an occurrence of the event on the business device 2 by monitoring the event information. Then, the event information extracting device 3 extracts the monitoring target event information and transmits the extracted event information to the monitoring device 7.

To begin with, in a process in step S1, the event information extracting device 3 judges from the detection of the event information whether the event occurs on the business device 2 or not. The event information extracting device 3, when judging that the event occurs (S1; YES), advances to a process in step S2. The event information extracting device 3, when judging that the event does not occur (S1; NO), returns to the process in step S1.

In the process in step S2, the event information extracting device 3 judges whether or not the event occurred on the business device 2 is the monitoring target event. This judgment is based on collation of the occurred event information with the setting information in the setting information database 13. The event information extracting device 3, when judging that the event occurred on the business device 2 is not the monitoring target event (S2; NO), returns to the process in step S1. The event information extracting device 3, when judging that the event occurred on the business device 2 is the monitoring target event (S2; YES), advances to a process in step S3.

FIG. 12 shows an example of a judging method by which the event information extracting device 3 judges whether or not the event information extracted from the business device 2 is the monitoring target event information. Note that a combination of items such as "event information ID", "type", "processing" and "judging method" shown in FIG. 12 are stored as the setting information in the setting information database 13.

The event information extracting device 3 judges according to the judging method shown in FIG. 12 whether or not the event information is the monitoring target event information. The event information is each assigned an event information ID. In FIG. 12, the event information assigned the event information ID [E35] is written in the XML and has designation as to whether the processing is executed or not. Further, when a sequenceName attribute of an ISIMonitoringEvent element is equal to "bpmmct_sequence" and when a systemName attribute is equal to "gg7188-vm1", the event information extracting device 3 judges that this event information is the monitoring target event information. Namely, in the present embodiment, it is judged from the system name and the sequence name whether the event information is the monitoring target event information or not. The judgment as to whether or not the event information is the monitoring target event information is not, however, limited to the information of these item names. Thus, the event information extracting device 3 monitors the event in accordance with the event information as shown in FIG. 12, and extracts the event information specifying the monitoring target event.

In the process in step S3, the event information extracting device 3 judges whether the processing of the event information judged to be the monitoring target event information is required or not. Whether the event information is required to be processed or not is judged from information showing whether the processing of the event information shown in FIG. 12 is required or not, more specifically, the information showing [processed] or [unprocessed] in the item of "processing". The event information extracting device 3, when judging that the processing of the event information is required (S3; YES), advances to a process in step S4. The event information extracting device 3, when judging that the processing of the event information is not required (S3; NO), advances to a process in step S5.

FIG. 13 is a table showing the processing methods for the monitoring target event information. These processing methods are stored as the setting information in the setting information database 13. The event information extracting device 3, when judging that the processing of the event information is required, executes the processing of the event information, corresponding to a processing target ID shown in FIG. 13. The processing ID is associated with the processing method in FIG. 13, and the event information extracting device 3 executes the processing of the event information by the processing method associated with the processing ID. For instance, when the processing of the event information is designated for the event information, and the processing target ID is T23, the event information extracting device 3 uses a function name as a (search) key that is contained in the event information, then searches master data having the service name for a service name associated with this key, and adds the searched service name to the event information. Thus, the event information extracting device 3 executes the processing of the event information.

In the process in step S4, the event information extracting device 3 processes the event information extracted from the business device 2. The process in step S5 is that the event information extracting device 3 converts the event information into data in the format (the data in the standard event format) suited to the process on the monitoring device 7. In a process in step S6, the event information extracting device 3 transmits the data in the standard event format to the monitoring device 7.

Thus, the event information extracting device 3 can monitor the process on the business device 2, extract the monitoring target data from the business device 2, convert the extracted data into the data in the format suited to the process on the monitoring device 7, and transmit the converted data to the monitoring device 7.

<Process on Monitoring Device>

Figure 14:
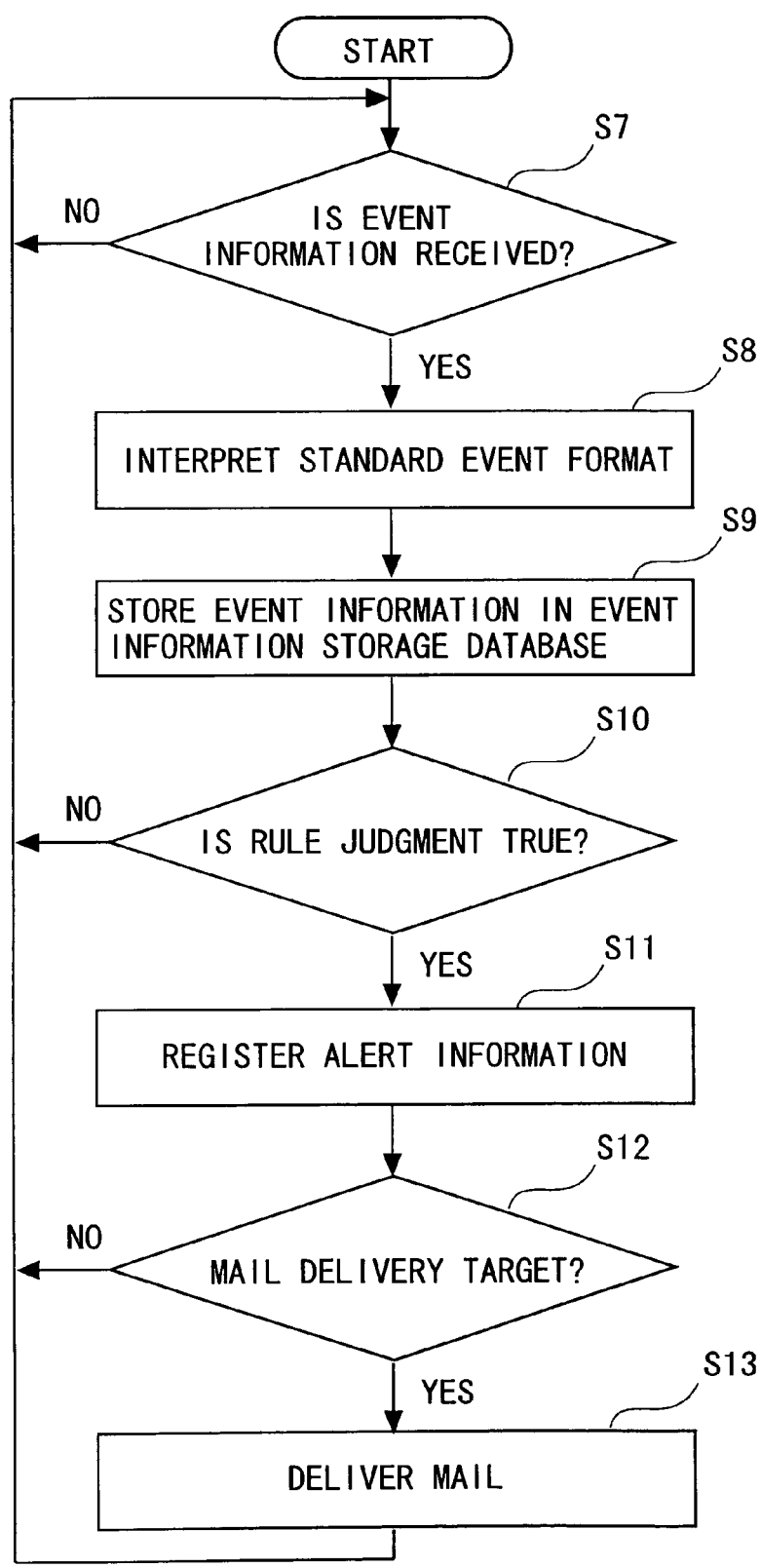
FIG. 14 is a diagram illustrating a first flowchart showing a process in a monitoring device according to the embodiment of the present invention.

FIG. 14 is a flowchart of the event information collecting unit 10 and the event information analyzing unit 11 in the monitoring device 7. In this process, the monitoring device 7 generates the alert information on the basis of the rule contained in the setting information database 13, and delivers a mail containing the generated alert information to the monitoring client.

To start with, in a process in step S7, the event information collecting unit 10 judges whether or not the event information is received from the event information extracting device 3. The event information collecting unit 10, when judging that the event information is received from the event information extracting device 3 (S7; YES), advances to a process in step S8. The event information collecting unit 10, when judging that the event information is not received from the event information extracting device 3 (S7; NO), returns to the process in step S7.

The process in step S8 is that the event information analyzing unit 11 interprets the event information (the standard event format) received from the event information extracting device 3 on the basis of the setting information stored in the setting information database 13. Next, in a process in step S9, the event information collecting unit 10 stores the received event information in the event information storage database 14.

A process in step S10 is that the event information analyzing unit 11 reads the event information from the event information storage database 14. The event information analyzing unit 11 executes, based on the setting information stored in the setting information database 13, a rule judgment of the event information read from the event information storage database 14. This rule is set by the design device 8 as the setting information in the setting information database 13. The event information analyzing unit 11 collates the event information with the rule, and, as a result of this collation, judges whether the rule judgment is true or not. The event information analyzing unit 11, when judging that the rule judgment is not true (S10; NO), returns to the process in step S7 that is to be conducted by the event information collecting unit 10. When judging that the rule judgment is true (S10; YES), the process in step S11, which is to be conducted by the event information analyzing unit 11, is executed.

A process in step S11 is that the event information analyzing unit 11 creates the alert information with respect to the information with the rule judgment being judged true, and stores the created alert information in the result storage database 15.

In a process in step S12, the display unit 12 judges whether or not the alert information stored in the result storage database 15 is delivery target information delivered by mail. The information showing whether or not the alert information stored in the result storage database 15 is the mail delivery target information, is set by the design device 8 as the setting information in the setting information database 13. The display unit 12, when judging that the registered alert information is the mail delivery target information (S12; YES), advances to a process in step S13. The display unit 12, when judging that the registered alert information is not the mail delivery target information (S12; NO), returns to the process in step S7. The process in step S13 is that the display unit 12 transmits the mail delivery target alert information to a predetermined mail transmitting destination address list.

FIG. 15 shows a relationship between a delivery mail ID, an alert information ID and a mail transmitting destination address list. The relationship therebetween is stored as the setting information in the setting information database 13. The delivery mail ID is information added to every piece of delivery target alert information. The alert information ID is an identifier of the alert information. The mail transmitting destination address list is information that designates a mail address of the transmitting destination to which the alert information is transmitted. FIG. 15 shows by way of an example the designation that the display unit 12, when the delivery mail ID is M03, transmits the information of which the alert information ID is R007 respectively to wwww@yyyy.zzzz.com, aaaa@yyyy.zzzz.com and bbbb@cccc.dddd.com contained in the transmitting destination address list.

Thus, the monitoring device 7 judges, based on the setting information stored in the setting information database 13, whether or not the information contained in the event information extracted from the event information extracting device 3 is the information of which the monitoring client should be notified. Then, the monitoring device 7, when judging that the information contained in the event information is the information of which the monitoring client should be notified, can notify the monitoring client of this information by e-mail.

Figure 16:
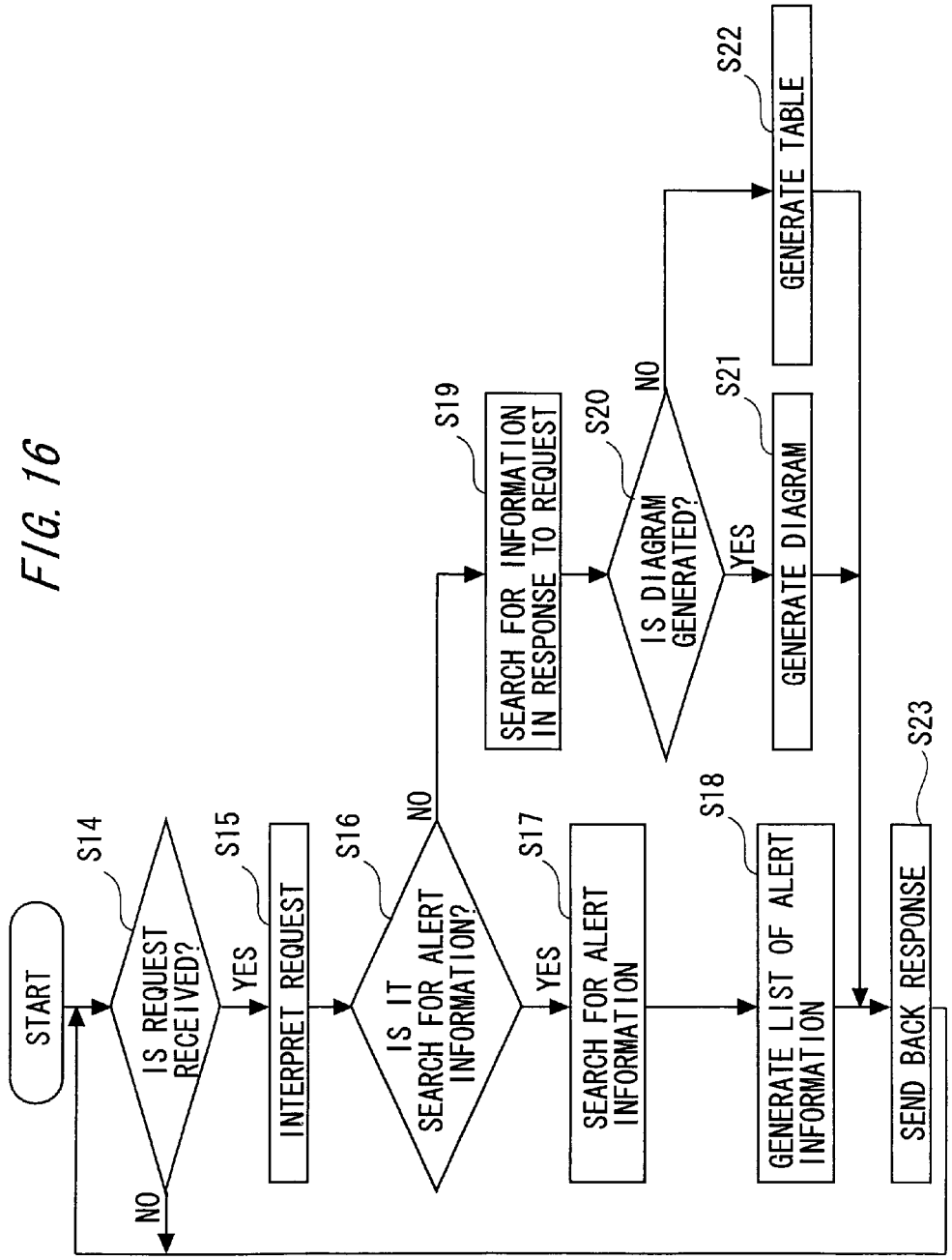
FIG. 16 is a diagram illustrating a second flowchart showing a process in a monitoring device according to the embodiment of the present invention.
Figure 17:
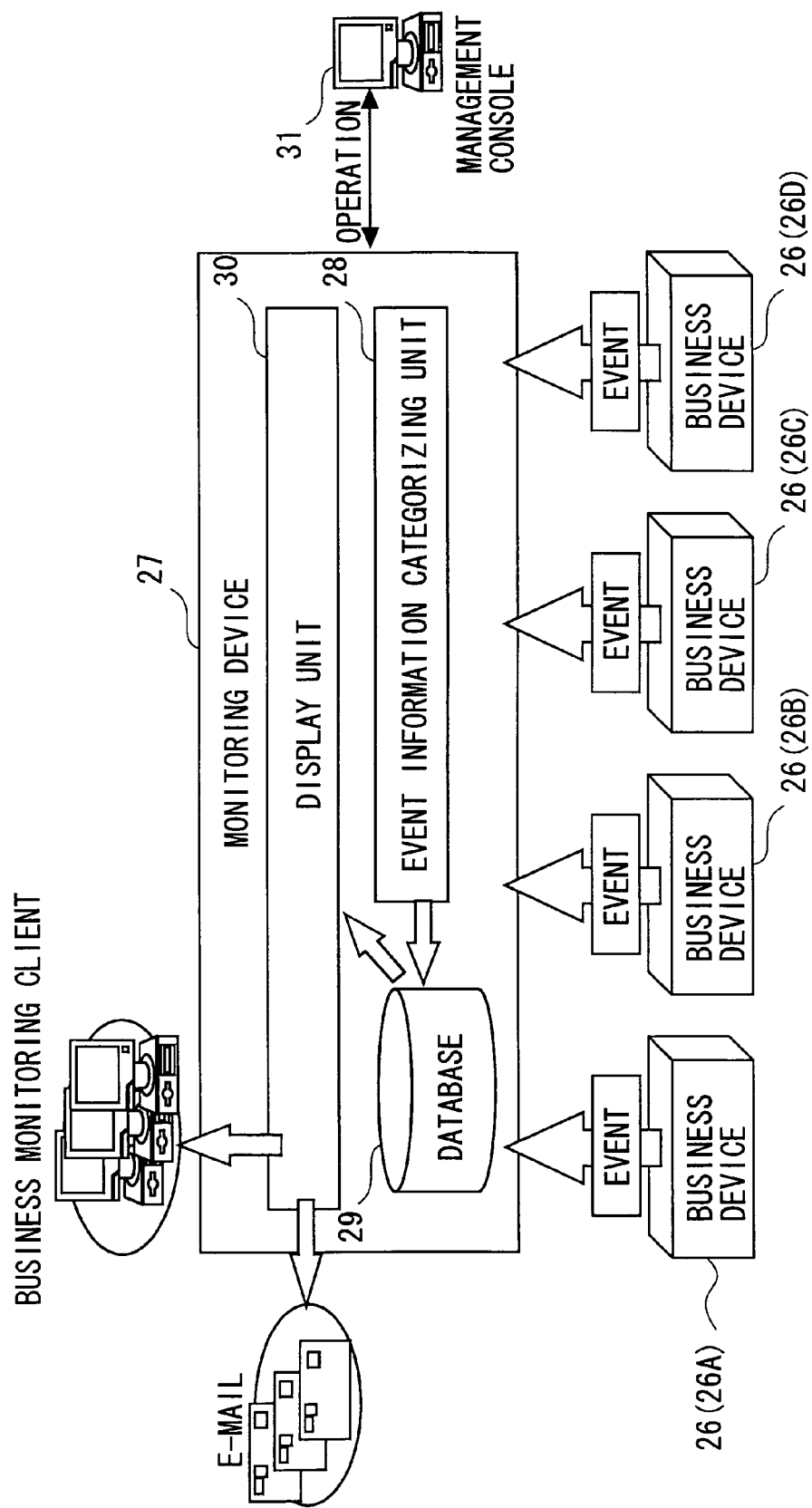
FIG. 17 is a diagram showing a system according to the prior art.

FIG. 16 is a second flowchart showing the process on the monitoring device 7. In the process in this second flowchart, the monitoring device 7 notifies, in response to a request from the monitoring client, the monitoring client of a list of the alert information and a chart or a table showing the processing result of the event information.

At first, in a process in step S14, the display unit 12 judges whether or not a request for information acquisition showing the processing result of the event information is received from the monitoring client via the mail delivery server 24 or the Web server 25. The display unit 12, when judging that the information acquisition request is received from the monitoring client (S14; YES), advances to a process in step S15. The display unit 12, when judging that the information acquisition request is not received from the monitoring client (S14; NO), returns to the process in step S14.

In the process in step S15, the display unit 12 reads the requested information from the received request (interprets the request). A process in step S16 is that the display unit 12 judges whether the information requested by the request is an alert search request or not. The display unit 12, when judging that the requested information is about the search for the alert information (S16; YES), advances to a process in step S17. The display unit 12, when judging that the requested information is not about the search for the alert information (S16; NO), advances to a process in step S19.

In the process in step S17, the display unit 12 searches the result storage database 15 for the alert information. The process in step S18 is that the display unit 12 generates information of a list of the alert information obtained as the search result from the result storage database 15. The display unit 12 advances to a process in step S23.

In a process in step S19, the event information analyzing unit 11, in response to the request given from the monitoring client, searches the event information storage database 14. The event information analyzing unit 11 reads the search target information from the event information storage database 14.

In a process in step S20, the event information analyzing unit 11 judges whether or not information for generating the chart is designated in the request given from the monitoring client. The event information analyzing unit 11, when judging that the chart is generated (S20; YES), advances to a process in step S21. The event information analyzing unit 11, when judging that the chart is not generated (S20; NO), deems that the table is generated, and advances to a process in step S22.

In the process in step S21, the event information analyzing unit 11, in response to the request given from the monitoring client, generates display data for displaying the chart to the monitoring client from the information read out of the event information storage database 14. The event information analyzing unit 11 stores the generated display data in the result storage database 15. The display unit 12 reads the display data from the result storage database 15. The display unit 12 advances to a process in step S23.

The process in step S22 is that the event information analyzing unit 11, in response to the request given from the monitoring client, generates data for displaying the table to the monitoring client from the information read out of the event information storage database 14. The event information analyzing unit 11 stores the generated display data in the result storage database 15. The display unit 12 reads the display data from the result storage database 15. The display unit 12 advances to the process in step S23.

In the process in step S23, the display unit 12, in response to the request given from the monitoring client, notifies the monitoring client, which has transmitted the request, of anyone of the alert information list, the chart and the table via the mail delivery server 24 in the case of receiving the request by mail and via the Web server 25 in the case of receiving the request through Web.

Thus, the monitoring device 7, in response to the request given from the monitoring client, enables the monitoring client to display anyone of the alert information list, the chart showing the processing result of the event information and the table showing the processing result of the event information at a present point of time 6. Accordingly, the monitoring system 16, in the case of configuring the system 1 as, for instance, a sales system at the retail store such as the supermarket, is capable of notifying the monitoring client of, if the sales of a predetermined item of commercial articles are larger than expected, information designated so as to be properly replenished with this item of commercial articles.

In the present embodiment, the event information extracting device 3 monitors the occurrence of the event information (e.g., the occurrence of the sales by selling the commercial articles), and provides the occurred event information to the monitoring device 7. The monitoring device 7 aggregates and analyzes the obtained information, and provides the results thereof to the monitoring client. Hence, the monitoring device 7 can provide the monitoring client with such an item of information impossible of being acquired by the conventional batch system as about a sales state that is, for example, as immediate as one hour.

Further, the monitoring device 7, in response to the request given from the monitoring client, can presume the information after a predetermined period of time and can display a chart or a table showing a presumed result. Accordingly, in the case of configuring the system 1 as the sales system at the retail store such as the supermarket, the monitoring system 16 notifies the monitoring client of the presumed result of the sales of the commercial articles up to an elapse of the predetermined period of time, whereby the monitoring client can previously replenish the retail store with the commercial articles.

Moreover, the monitoring device 7, according to the rule set in the setting information, generates the alert information and notifies the monitoring client of the alert information by mail or via the Web. Thus, the monitoring system 16, in case a state of emergency happens in the system 1, can promptly notify the monitoring client of the information on the emergency. Further, the individual identifiable information such as the cards is processed in the monitoring system 16, the monitoring system 16 can promptly notify the monitoring client of the individual who expended a predetermined or greater amount of money for a predetermined period a predetermined or larger number of times by the card etc on the business device 2.

Further, the monitoring device 7 presumes, based on the information contained in the event information, the information that will be desired by the monitoring client after a predetermined period of time, and, when a rule set in the setting information with respect to the presumed information is true, may generate the alert information. Then, the monitoring device 7 notifies the monitoring client of the generated alert information by mail or via the Web. Thus, the monitoring client can grasp a problem of the system by presuming the information after the predetermined period of time (in the future).

The monitoring system 16 (the event information extracting device 3) detects the event information corresponding to the business process occurred in the business device 2, and notifies the monitoring device 7 of the detected event information. Accordingly, unlike the conventional system that executes the batch process as done once a day or per month, the monitoring system 16 can gasp the information of the business process occurring at the present point of time and the state of the business device 2. Then, the monitoring system 16 can analyze, based on the information occurring at the present point of time, the business process, and can provide the analyzed result at the present point of time.

Further, the monitoring system 16 (the event information extracting device 3) sorts a relationship between the plurality of business devices 2 and a relationship between the items of event information occurred in a way that associates the event information outputted by the business devices 2 with the logical processes, thus visually notifying the monitoring client of the present business activities. In this way, the monitoring client can gasp the problem of the whole system 1 and can support continuous improvement of the system 1.

The monitoring device 7 monitors, according to the rule contained in the setting information, the information that needs giving the alert, and notifies the monitoring client of the monitor result. Therefore, the information, which needs monitoring, is transmitted to the monitoring client at high efficiency, and it is therefore possible to reduce a cost for coping with invalid and illegal business activities.

<Modified Example>

In the present embodiment, the event information extracting device 3 is to connect with the business device 2. A modified example is, however, that the event information extracting device 3 may detect, on the communication line, the business data transmitted from the business device. Then, the event information extracting device extracts the monitoring target event information from within the business data detected on the communication line. Thus, the monitoring device 7, through an operation that the event information extracting device 3 not being a direct recipient of the business data extracts the monitoring target event information from the business data, may monitor the business device.

<Others>

The disclosures of Japanese patent application No. JP2006-129466 filed on May 8, 2006 including the specification, drawings and abstract are incorporated herein by reference.

What is claimed is:

1. A monitoring system comprising an extracting device, and a monitoring device,
   the extracting device including a processor and a memory, the processor to execute instructions stored on the memory to perform:
   monitoring event information of an event used in a business data processing on a business data processing device;
   judging, when the business data processing occurs on the business data processing device, whether or not the event information is monitoring target event information according to a judging method of whether an ID assigned to the event information is written in setting information including a designation as to whether processing is executed or not;
   processing the event information when the event information is judged as the monitoring target event information and the ID assigned to the event information is judged as written in the setting information including the designation; and
   transmitting the processed event information to a monitoring device when the event information is judged as the monitoring target event information,
   the monitoring device including a processor, and a memory, the processor to execute instructions stored on the memory to perform:
   storing in a storage unit the event information transmitted by the extracting device;
   analyzing the event information stored in the storage unit; and
   notifying result data analyzed to a monitoring client.

2. The monitoring system according to claim 1, wherein the processor of the monitoring device further reads setting information stored in a setting information storage unit, and execute the analyzing on the basis of the readout setting information.

3. The monitoring system according to claim 1, wherein the processor of the monitoring device further converts the result data into data in a data format to notify a monitoring client of the result data by electronic mail, and provides the monitoring client with the converted result data via a mail delivery server connected to the monitoring device.

4. The monitoring system according to claim 1, wherein the processor of the monitoring device further converts the result data into data in a data format to display the result data on a Web site, and displays the converted result data to a monitoring client via a Web server connected to the monitoring device.

5. The monitoring system according to claim 2, wherein the processor of the monitoring device further assorts the event information stored in the storage unit into predetermined groups to collect the event information, executes a statistical process of the event information, compares statistical result of the event information with the setting information and generates alert information corresponding to a result of the comparison.

6. The monitoring system according to claim 1, the processing including: searching data associated with a key defined to be related to the item name in the setting information; and adding a searched result to the event information.

7. The monitoring system according to claim 1, the processing including: calculating a difference between a starting time and an end time of processing related to the event information; and adding a calculated result to the event information.

8. An information processing method comprising extracting event information and monitoring the event information by a monitoring device,
   the extracting including:
   monitoring event information of an event used in a business data processing on a business data processing device;
   judging, when the business data processing occurs on the business data processing device, whether or not the event information is monitoring target event information according to a judging method of whether an ID assigned to the event information is written in setting information including a designation as to whether processing is executed or not;
   processing the event information when the event information is judged as the monitoring target event information and the ID assigned to the event information is judged as written in the setting information including the designation; and
   transmitting the processed event information to the monitoring device when the event information is judged as the monitoring target event information,
   the monitoring including:
   storing the event information transmitted;
   analyzing the event information stored; and
   notifying result data analyzed to a monitoring client.

9. The information processing method according to claim 8, the processing including: searching data associated with a key defined to be related to the item name in the setting information; and adding a searched result to the event information.

10. The information processing method according to claim 8, the processing including: calculating a difference between a starting time and an end time of processing related to the event information; and adding a calculated result to the event information.

11. An extracting device comprising a processor and a memory, the processor to execute instructions stored on the memory to perform:
    monitoring event information of an event used in a business data processing on a business data processing device;
    judging, when the business data processing occurs on the business data processing device, whether or not the event information is monitoring target event information according to a judging method of whether an ID assigned to the event information is written in setting information including a designation as to whether processing is executed or not;
    processing the event information when the event information is judged as the monitoring target event information and the ID assigned to the event information is judged as written in the setting information including the designation; and
    transmitting the transformed event information to a monitoring device when the event is judged as the monitoring target.

12. The extracting device according to claim 11, the processing including: searching data associated with a key defined to be related to the item name in the setting information; and adding a searched result to the event information.

13. The extracting device according to claim 11, the processing including: calculating a difference between a starting time and an end time of processing related to the event information; and adding a calculated result to the event information.

14. A computer-readable, non-transitory medium storing a program executed by an extracting device, the program causing the extracting device to perform:
  monitoring event information of an event used in a business data processing on a business data processing device;
  judging, when the business data processing occurs on the business data processing device, whether or not the event information is monitoring target event information according to a judging method of whether an ID assigned to the event information is written in setting information including a designation as to whether processing is executed or not;
  processing the event information when the event information is judged as the monitoring target event information and the ID assigned to the event information is judged as written in the setting information including the designation; and
  transmitting the transformed event information to a monitoring device when the event is judged as the monitoring target.

15. The computer-readable, non-transitory medium storing the program according to claim 14, the processing including: calculating a difference between a starting time and an end time of processing related to the event information; and adding a calculated result to the event information.

16. The computer-readable, non-transitory medium storing the program according to claim 14, the processing including: searching data associated with a key defined to be related to the item name in the setting information; and adding a searched result to the event information.

* * * * *